United States Patent

Jung

[11] Patent Number: 5,808,685
[45] Date of Patent: Sep. 15, 1998

[54] BLOCK MATCHING MOTION ESTIMATION APPARATUS EMPLOYING A WEIGHT FUNCTION

[75] Inventor: Hae-Mook Jung, Seoul, Rep. of Korea

[73] Assignee: Daewoo Electronics Co., Ltd., Seoul, Rep. of Korea

[21] Appl. No.: 819,528

[22] Filed: Mar. 17, 1997

Related U.S. Application Data

[63] Continuation-in-part of Ser. No. 367,366, Dec. 30, 1994, abandoned.

[51] Int. Cl.$^6$ ..................................................... H04N 7/36
[52] U.S. Cl. ................................................ 348/416; 348/699
[58] Field of Search ................................. 348/413, 412, 348/415, 416, 420, 401, 699, 405, 407; 382/239

[56] References Cited

U.S. PATENT DOCUMENTS

| | | | |
|---|---|---|---|
| 5,333,012 | 7/1994 | Singhal et al. | 348/405 |
| 5,515,105 | 5/1996 | Lim | 348/405 |
| 5,543,845 | 8/1996 | Asamura et al. | 348/407 |

*Primary Examiner*—Amelia Au
*Attorney, Agent, or Firm*—Anderson, Kill & Olick, P.C.

[57] ABSTRACT

A blocking matching motion estimation apparatus estimates a displacement of a search block in a current frame with respect to each of candidate blocks in a previous frame to produce motion vectors and error signals representing the similarity between the search block and a candidate block. The motion estimating apparatus employs a weight function to weight a number of error signals based on a MSE measurement and selects a weighted error signal entailing a minimum error to produce a motion vector corresponding thereto. The weight function is determined by using either a local variance for a localized subblock defined for each pixel in the search block or a gradient of pixels in the search block filtered by a 2-dimensional gradient filter.

5 Claims, 2 Drawing Sheets

BLOCK MATCHING MOTION ESTIMATION APPARATUS EMPLOYING A WEIGHT FUNCTION

CROSS REFERENCE TO RELATED APPLICATION

This application is a continuation-in-part of U.S. Ser. No. 08/367,366 filed on Dec. 30, 1994, now abandoned.

FIELD OF THE INVENTION

The present invention relates to a motion estimation apparatus for use in an image signal encoding system; and, more particularly, to a motion estimation apparatus for detecting a motion vector employing a weight function.

DESCRIPTION OF THE PRIOR ART

When an image signal comprising a sequence of image "frames" is expressed in a digital form, substantial amounts of data are generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the effective compression techniques.

In the motion compensated interframe coding scheme, current frame data is predicted from previous frame data based on an estimation of the motion between the current and the previous frames. Such estimated motion may be described in terms of two dimensional motion vectors representing the displacement of pixels between the previous and the current frames.

One of the motion vector estimation schemes which have been proposed in the art is a block matching algorithm. According to the block matching algorithm, a current frame is divided into a plurality of equal-sized search blocks. The size of a search block typically ranges between 8×8 and 32×32 pixels. To determine a motion vector for a search block in the current frame, a similarity measurement is performed between the search block of the current frame and each of a multiplicity of equal-sized candidate blocks included in a generally larger search region within a previous frame. An error signal obtained by employing the MSE (mean square error) measurement is used to carry out the similarity measurement between the search block of the current frame and each of the candidate blocks in the search region. The error signal may be expressed as follows.

$$MSE = \frac{1}{H \times V} \sum_{i=1}^{H} \sum_{j=1}^{V} (I(i,j) - P(i,j))^2$$

wherein H×V represents the size of a search block; I(i,j) represents a luminance level of a pixel, i.e., a pixel value at a coordinate (i,j) in the search block; and P(i,j) it represents a pixel value at the coordinate (i,j) in a candidate block.

And a motion vector, by definition, represents a displacement between the search block and a candidate block which yields a minimum error signal. The motion vector is then used in a receiver to construct a picture from a previous frame on a block-by-block basis.

Such a motion compensated interframe coding scheme, however, does not take into account the continuity between adjacent blocks due to the use of the error signal obtained by using the MSE measurement for representing the correlation between blocks. Consequently, the block boundaries may become visible and noticeable to the human observer. Such blocking effect occurring at the boundaries between adjacent blocks in a motion compensation process and the block structure artifacts caused by the blocking effect tend to deteriorate the quality of the coded image.

SUMMARY OF THE INVENTION

It is, therefore, an object of the invention to provide an improved motion estimation apparatus capable of reducing the blocking effect.

It is another object of the invention to provide an improved motion estimation apparatus for detecting a motion vector taking into account of the continuity of boundary areas between adjacent blocks.

In accordance with the invention, there is provided an apparatus which estimates a displacement of a search block in a current frame with respect to each of candidate blocks in a previous frame to produce motion vectors and error signals representing the similarity between the search block and a candidate block. The motion estimating apparatus employs a weight function to weight a number of error signals based on a MSE measurement and selects a weighted error signal entailing a minimum error to produce a motion vector corresponding thereto.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
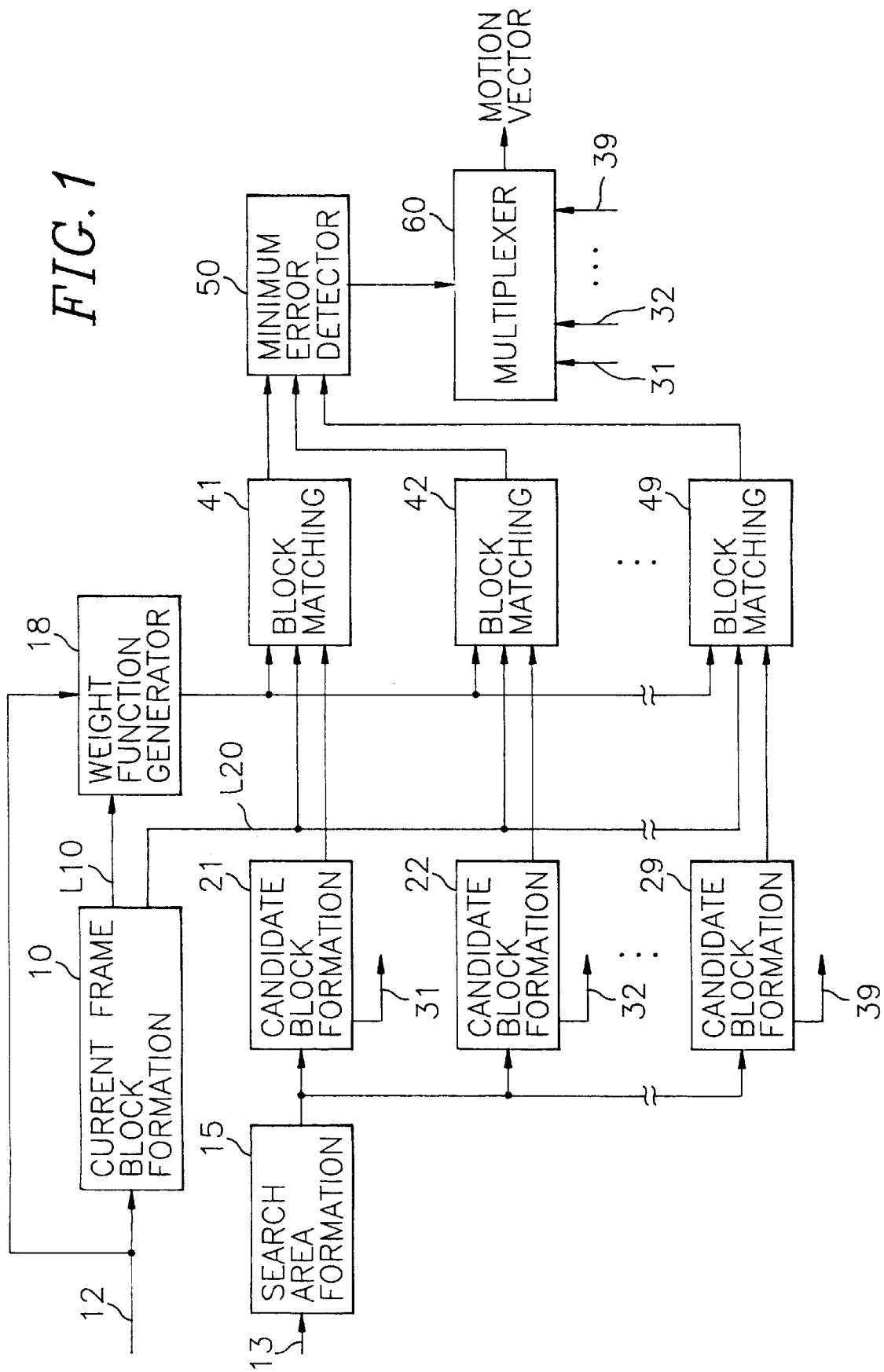
FIG. 1 shows a schematic block diagram of a block matching motion estimation apparatus employing a weight function in accordance with the invention.

Referring to FIG. 1, there is shown a preferred embodiment of a block matching motion estimation apparatus incorporated in a motion estimation and compensation system which is used to achieve a significant data compression by removing the redundancies between successive frames, i.e., a current frame and its adjacent or previous frame. That is to say, there may be differences between the current frame and the previous frame, induced by a displacement or motion of an object; however, such differences may be confined to a relatively small region within a frame. Therefore, it is not necessary to transmit the entire image data of a current frame to a receiver (not shown). Instead, it may suffice to transmit the displacement information, i.e., motion vectors. The receiver then reconstructs the current frame from its previous frame whose image data is stored in a frame memory within the receiver, utilizing the motion vectors.

As shown, the current frame signal is provided through a line 12 to a current frame block formation section 10 and a weight function generator 18. The current frame block formation section 10 serves to divide the current frame into a plurality of search blocks of an identical size, each comprising H×V pixels. For the purpose of illustration, it is assumed that both H and V are equal to a same number, e.g., 16, for each search block of pixels in the current frame. Each of the search blocks containing pixel data is sequentially applied to a number of block matching sections through a line L20, only three 41, 42 and 49 of which are exemplarily shown therein, and formation data representing the position of the search block is fed to the weight function generator 18 via a line L10 for generating a weight function.

The weight function generator 18 defines a localized subblock for each pixel within the search block based on the current frame signal and the formation data from the current frame block formation section 10, wherein each pixel within the search block and pixels neighboring thereto constitute each of the localized subblocks having SH×SV pixels. And then, a local variance for the localized subblock is calculated to be used as the weight function.

The local variance is defined as follows:

$$var(i,j) = \frac{1}{SH \times SV} \sum_{k=1}^{SH} \sum_{l=1}^{SV} (I(k,l) - I_{av})^2$$

wherein var(i,j) represents the local variance of a pixel at a coordinate (i,j) in the search block; SH×SV is the size of the localized subblock corresponding to the pixel at the coordinate (i,j) in the search block; I(k,l) is a pixel value at the pixel coordinate (k,l) in the localized subblock; and $I_{av}$ represents the mean pixel value of all pixels within the localized subblock.

The mean pixel value is defined as follows:

$$I_{av} = \frac{1}{SH \times SV} \sum_{k=1}^{SH} \sum_{l=1}^{SV} I(k,l)$$

Figures 2, 3:
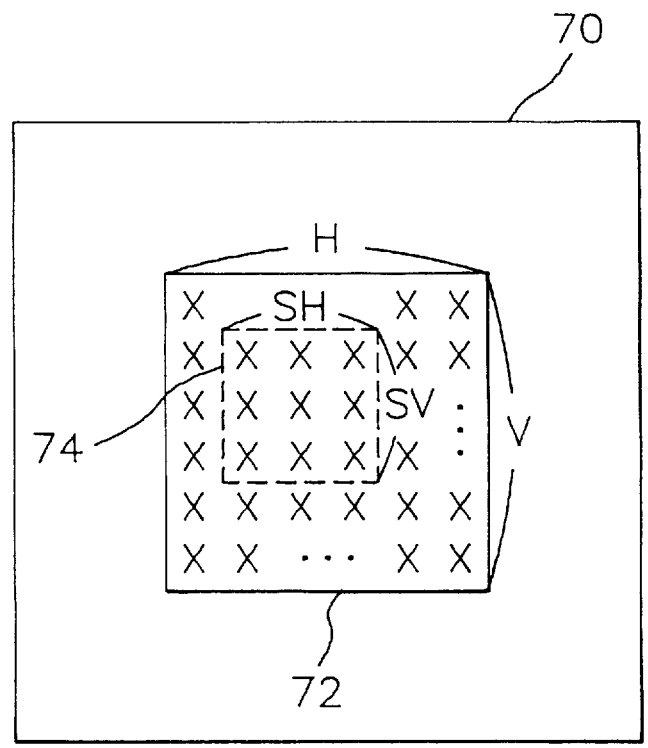
FIG. 2 illustrates an exemplary block matching process between a search block having a localized subblock therein and a large search region of the previous frame.
FIG. 3 represents a filter window of a 2-dimensional gradient filter to produce another embodiment of the weight function.

For example, referring to FIG. 2, there is shown a localized subblock 74, having 3×3 pixels, in the search block 72 for calculating the local variance of the pixel located at the center of the subblock 74. The local variance corresponding to the subblock 74 is determined by the pixel values of all pixels included in the subblock 74.

The weight function for each pixel within the search block is then provided to a corresponding block matching section.

Meanwhile, the previous frame stored in a memory (not shown) is fed through a line 13 to a search area formation section 15. The search area formation section 15 defines a plurality of generally large search regions in the previous frame with an equal size, shape and search pattern, whereby the search or comparison will be carried out. The number of the search regions is same as the number of the search blocks.

After the search regions are determined at the search area formation section 15, the search region data is sequentially applied to a number of candidate block formation sections, only three 21, 22 and 29 of which are illustratively shown therein. The number of candidate block formation sections is same as that of the block matching sections. At each candidate block formation section, a candidate block of pixels is generated from the search region as the search block sweeps through the search region from left to right starting at the upper left-most position moving horizontally one pixel position at a time, and then vertically down through the search region moving one scan line at a time, until finally reaching the lower right-most position within the search region. All the possible candidate blocks with the size of H×V pixels are formed within the search region. And then, the displacement between each candidate block and the search block of the current frame is derived and then provided to a multiplexer 60 through lines 31 to 39 as a motion vector of that candidate block. The pixel data of each candidate block is also provided from each of the candidate block formation sections 21 to 29 to each of the corresponding block matching sections 41 to 49.

Conventionally, comparison of luminance level or light intensity is performed between corresponding pixels in the search block and the candidate block by employing, e.g., an MSE measurement to yield the error signal for that candidate block. The error signal indicates the degree of similarity between the search block and the selected candidate block.

In accordance with the present invention, at each of the block matching sections 41 to 49, a weighted error signal "W-MSE" corresponding to each of the candidate blocks is calculated by employing the MSE measurement from the luminance difference between pixels in the search block and those in each of the candidate blocks weighted with the local variances provided as weight functions from the weight function generator 18 in order to detect a motion vector which entails a smooth continuity of adjacent blocks to be reconstructed.

The weighted error signal "W-MSE" for each of the candidate blocks is defined as follows:

$$W - MSE = \frac{1}{H \times V} \sum_{i=1}^{H} \sum_{j=1}^{V} (I(i,j) - P(i,j))^2 \times var(i,j)$$

wherein H×V is the size of a search block; I(i,j) is a pixel value at a pixel coordinate (i,j) in the search block; and P(i,j) is a pixel value at the a pixel coordinate (i,j) in a candidate block.

All the weighted error signals from the block matching sections 41 to 49 are supplied to a minimum error detector 50. The minimum error detector 50 compares the weighted error signals to select a minimum error signal which has a smallest error for each of the search blocks; and outputs a selection signal which indicates the candidate block corresponding to the minimum error signal to the motion vector selector 60. The motion vector selector 60, which is of a conventional multiplexer, in response to the selection signal, chooses the displacement vector of the candidate block, which corresponds to the minimum error signal. As described above, if a candidate block has the minimum error signal, that candidate block will be most similar to the search block; consequently, the displacement vector of the candidate block will be chosen as the motion vector for the corresponding search block.

FIG. 3 shows a filter window of a 2-dimensional gradient filter employed to derive another embodiment of the weight function.

At the weight function generator 18, the search block is filtered by the 2-dimensional gradient filter to produce a gradient function as the weight function. The gradient function is defined as follows:

$$\nabla(i,j) = \sum_{k=-1}^{1} \sum_{l=-1}^{1} I(i+k,j+l) \times F(k,l)$$

wherein (i,j) represents the gradient at a coordinate (i,j) in a search block; I(i+k,j+l) represents a pixel value at the coordinate (i+k,j+l); and F(k,l) represents a filter coefficient of a gradient filter.

In a manner similar to the one set forth above, such a weight function will be provided to the blocking matching sections 41 to 49 to weight the error signal calculated at the block matching sections 41 to 49 to produce the weighted error signal. The weighted error signal can be represented as follows:

$$W - MSE = \frac{1}{H \times V} \sum_{i=1}^{H} \sum_{j=1}^{V} (I(i,j) - P(i,j))^2 \times |\nabla(i,j)|$$

wherein H×V is the size of a search block; I(i,j) is a pixel value at a pixel coordinate (i,j) in the search block; and P(i,j) is a pixel value at the pixel coordinate (i,j) in a candidate block.

All the weighted error signals derived through the filter will be provided to the minimum error detector 50 to select a motion vector which yields a minimum error, as described above.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for detecting motion vectors between a current frame and a previous frame of video signals, wherein the current frame is divided into a plurality of search blocks of an identical size and the previous frame is divided into a corresponding number of search regions, each search region being further divided into a multiplicity of candidate blocks of said identical size, which comprises:

means for motion-estimating a search block with respect to each of the candidate blocks to produce candidate motion vectors corresponding thereto, each of the candidate motion vectors representing a displacement of pixels between the search block and said each of the candidate blocks;

means for deriving a local variance for each pixel within the search block to thereby provide the local variance as a weight function;

means for producing a weighted error signal for said each of the candidate blocks based on pixel values of the search block, pixel values of said each of the candidate blocks and the weight function corresponding to each pixel within the search block; and means for choosing a candidate motion vector of a candidate block corresponding to a weighted error signal entailing a minimum error as a motion vector corresponding to the search block.

2. The apparatus of claim 1, wherein the local variance deriving means includes:

means for selecting a localized subblock for said each pixel within the search block; and means for calculating the local variance for said each pixel within the search block as:

$$var(i,j) = \frac{1}{SH \times SV} \sum_{k=1}^{SH} \sum_{l=1}^{SV} (I(k,l) - I_{av})^2$$

wherein var(i,j) represents the local variance of a pixel at a coordinate (i,j) in the search block; SH×SV is the size of the localized subblock corresponding to the pixel at the coordinate (i,j) in the search block; I(k,l) is a pixel value at a pixel coordinate (k,l) in the localized subblock; and $I_{av}$ represents a mean pixel value of all pixels within the localized subblock.

3. The apparatus of claim 2, wherein the localized subblock is defined by a pixel within the search block and pixels surrounding said pixel.

4. The apparatus of claim 3, wherein the mean pixel value is defined as:

$$I_{av} = \frac{1}{SH \times SV} \sum_{k=1}^{SH} \sum_{l=1}^{SV} I(k,l)$$

5. The apparatus of claim 4, wherein the weighted error signal corresponding to each of the candidate blocks is calculated as:

$$W - MSE = \frac{1}{H \times V} \sum_{i=1}^{H} \sum_{j=1}^{V} (I(i,j) - P(i,j))^2 \times var(i,j)$$

wherein W-MSE is a weighted error signal; H×V is the size of a search block; I(i,j) is a pixel value at the pixel coordinate (i,j) in the search block; and P(i,j) is a pixel value at the pixel coordinate (i,j) in a candidate block.

\* \* \* \* \*